United States Patent
Hu (10) Patent No.: US 9,664,812 B2
(45) Date of Patent: May 30, 2017

(54) METHOD AND APPARATUS FOR DETECTION AND QUANTIFICATION OF BOREHOLE STANDOFF

(71) Applicant: Weatherford/Lamb, Inc., Houston, TX (US)

(72) Inventor: David Guoyu Hu, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 825 days.

(21) Appl. No.: 13/863,085

(22) Filed: Apr. 15, 2013

(65) Prior Publication Data

US 2014/0306711 A1    Oct. 16, 2014

(51) Int. Cl.
*G01V 3/20* (2006.01)

(52) U.S. Cl.
CPC .................................. *G01V 3/20* (2013.01)

(58) Field of Classification Search
CPC ... G01V 3/18; G01V 3/12; G01V 3/00; G01V 3/20; G01V 3/30; H01Q 19/10; H01Q 15/14; E21B 47/26; E21B 47/00
USPC ............... 324/323, 324, 332–338, 340, 341, 324/344–347, 354, 355, 357, 366, 367, 324/370
See application file for complete search history.

(56) References Cited

U.S. PATENT DOCUMENTS

| | | | | |
|---|---|---|---|---|
| 5,049,822 A | * | 9/1991 | Zoltan | G01V 3/20 324/367 |
| 6,191,588 B1 | * | 2/2001 | Chen | G01V 3/20 324/367 |
| 2010/0019771 A1 | * | 1/2010 | Gold | G01V 3/24 324/355 |
| 2010/0097068 A1 | * | 4/2010 | Itskovich | G01V 3/20 324/367 |

OTHER PUBLICATIONS

Examination Report No. 1 in counterpart Australian Appl. 2014202117, dated Dec. 19, 2014.
First Office Action in counterpart Canadian Appl. 2,848,886, dated Apr. 2, 2015.
Second Office Action in counterpart Canadian Appl. 2,848,886, dated Jan. 19, 2016.
Shizhen, K.E., "Full 3-D numerical modeling of borehole electric image logging and the evaluation model of fracture," Sci China Ser D-Earth Sci, Oct. 2008, vol. 51, Supp. II, pp. 170-173.

* cited by examiner

*Primary Examiner* — Tung X Nguyen
*Assistant Examiner* — Robert P Alejnikov, Jr.
(74) *Attorney, Agent, or Firm* — Blank Rom LLP (57) ABSTRACT

A method of quantifying borehole properties, comprising: injecting an electric current from an outer button and an inner button disposed on an equipotential pad into a subterranean formation surround by the borehole, measuring an apparent conductivity or a scaled current for each button, modeling the measurements at a sequence of standoff locations, and, using an inversion technique to determine at least (Continued)

one of the following borehole properties: mudcake thickness, mudcake resistivity, diameter of invasion, flushed zone resistivity and true formation resistivity.

26 Claims, 5 Drawing Sheets

METHOD AND APPARATUS FOR DETECTION AND QUANTIFICATION OF BOREHOLE STANDOFF

CROSS-REFERENCE TO RELATED APPLICATIONS

Not Applicable.

BACKGROUND OF THE DISCLOSURE

Drilling fluid, also known as "drilling mud" or "mud," has been employed in drilling for a many years. Drilling fluids may be water based, oil based or synthetic based. Any of a number of liquid and gaseous fluids and mixtures of fluids and solids (as solid suspensions, mixtures and emulsions of liquids, gases and solids) used in operations to drill boreholes into the earth may be used as drilling fluids. In addition, drilling fluids may contain emulsified water, oil, suspended solids or a combination of these materials. In short, drilling fluids may be any substance that will limit or prevent formation fluids from entering a wellbore.

Among the positive benefits of drilling mud is better control of the wellbore. Specifically, if the drilling fluid is of an appropriate weight it can, at least in part, assist in controlling unwanted inflow into the wellbore from the surrounding formation. The weight of the drilling fluid can also help prevent the collapse of the borehole or casing. Broadly speaking, because the specific gravity of the drilling fluid is greater than the specific gravity of the surrounding fluids in the wellbore, formation fluids are largely prevented from entering the wellbore.

Because the drilling fluid is under pressure, it may "cake" on the borehole wall. When drilling fluid adheres to the borehole wall, it is commonly referred to as "mudcake." From the perspective of a driller, mudcake may have both positive and negative aspects. A certain level of mudcake build up is desirable to isolate the formation fluid from the wellbore.

On the other hand, mud may penetrate into the formation surrounding the wellbore. If excessive mudcake deposition occurs, issues such as stuck pipe and damage to the formation may occur. In addition, if mudcake thickness is inappropriately excessive, it may be more difficult for formation fluids, such as oil and gas, to be extracted from the formation. As such, it is desirable to know if mudcake is present in the borehole and also the thickness of the mudcake in the wellbore.

Currently, several tools are sensitive to the presence and thickness of mudcake. Among these tools are a microlog tool, a microlaterolog tool and an electric image logging tool.

Figure 1A:
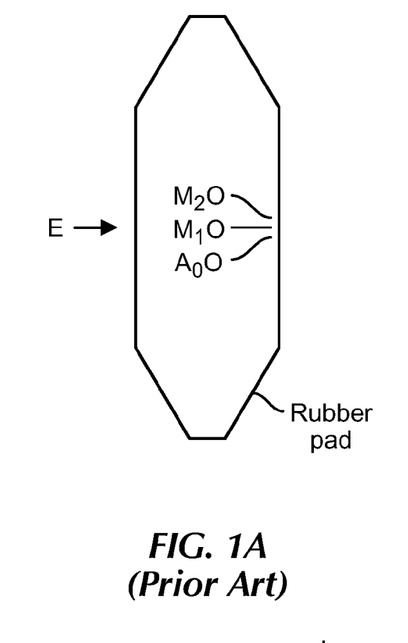
FIG. 1A illustrates a schematic front view of a prior art microlog device.
Figure 1B:
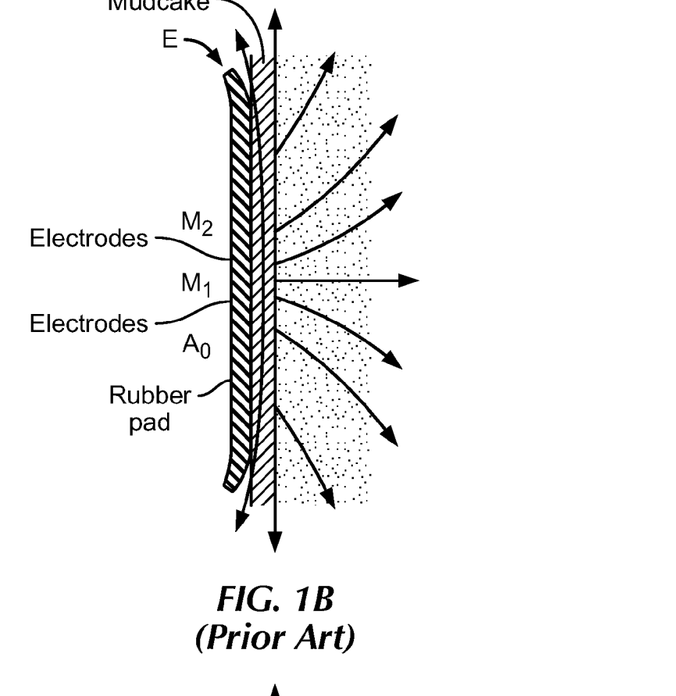
FIG. 1B illustrates a schematic side view of the prior art microlog device illustrated in FIG. 1A.

A prior art microlog tool E is illustrated in FIGS. 1A and 1B. Microlog or microelectrolog devices or tools, as their names imply, are electrical logging tools with electrodes. The electrodes are mounted on pads which are kept in contact with the wellbore, also known as a borehole, wall. The microlog tool seen in FIGS. 1A and 1B utilizes an unfocused measurement based on the principle of a normal and a lateral.

In operation, current is emitted from a button $A_o$, and the potentials of the two electrodes $M_1$ and $M_2$ are measured. To ensure a shallow depth of investigation, the spacing between electrodes $M_1$ and $M_2$ is on the order of about one inch. The difference in the potential between electrodes $M_1$ and $M_2$ forms a lateral or inverse measurement that is mostly influenced by the presence of mudcake on the adjacent borehole wall.

The potential on electrode $M_2$ forms a normal measurement which, being farther from the current source, is influenced more by the flushed zone. The influence of mudcake, especially in the case of resistive formation and a conductive and thick mudcake, is a major disadvantage for the purpose of determining $R_{xo}$ (flushed zone resistivity). However, the electromagnetic curves separated when there is an invasion of the formation by the mud. This separation has proven to be a reliable indicator of permeable zones. In other words, because the mud is able to enter the formation, the formation is likely sufficiently permeable to allow hydrocarbons to flow into the borehole and, ultimately, to the surface for extraction and sale.

Figure 2A:
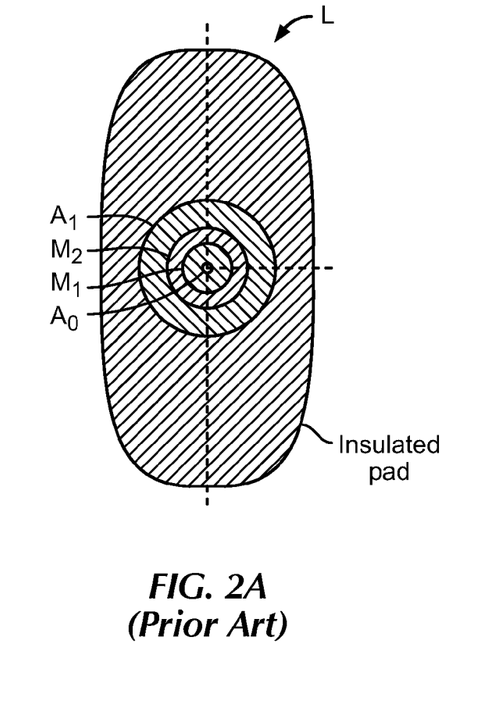
FIG. 2A illustrates a schematic front view of a prior art microlaterolog device.
Figure 2B:
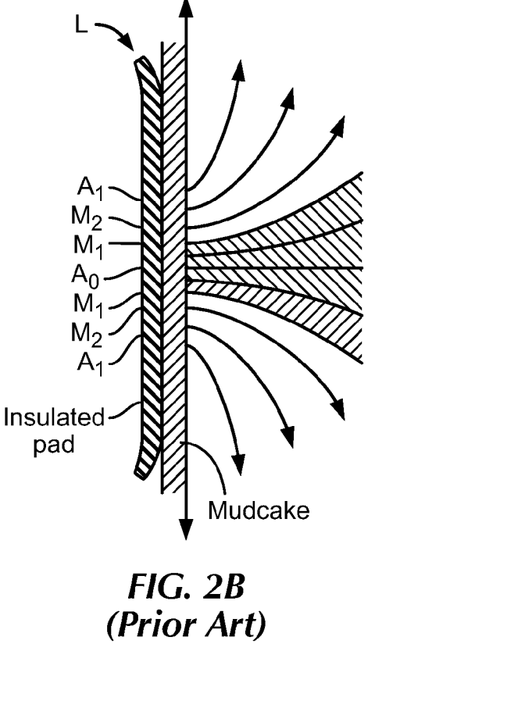
FIG. 2B illustrates a schematic side view of the prior art microlaterolog device illustrated in FIG. 2A.

In order to improve the determination of $R_{xo}$, (flushed zone resistivity), a focused or microlaterolog device L was developed. As illustrated in FIGS. 2A and 2B, the microlaterolog device L employs a bucking current from electrode $A_1$ which focuses the measurement current to penetrate the mudcake. Depending on the contrast between $R_{xo}$ and $R_t$ (True Formation Resistivity), 90% of the measured signal comes from the first two to four inches in front of the pad, i.e. where mudcake is located in the borehole.

Figures 3A, 3B:
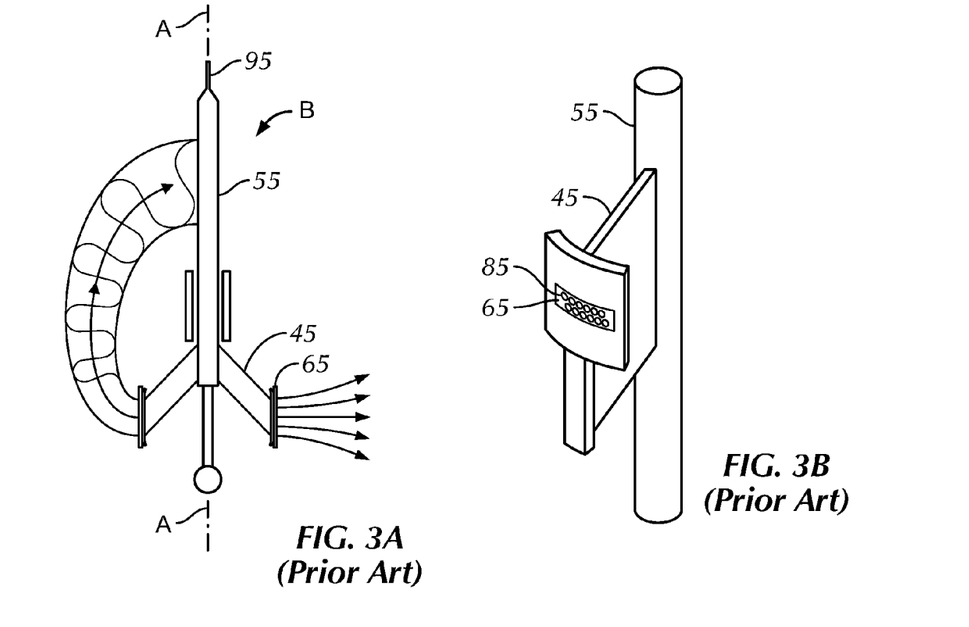
FIG. 3A illustrates a schematic side view of a prior art borehole electric image logging tool.
FIG. 3B illustrates a perspective view of an arm of the prior art borehole electric image logging tool have a pad with buttons disposed thereon.
Figure 3C:
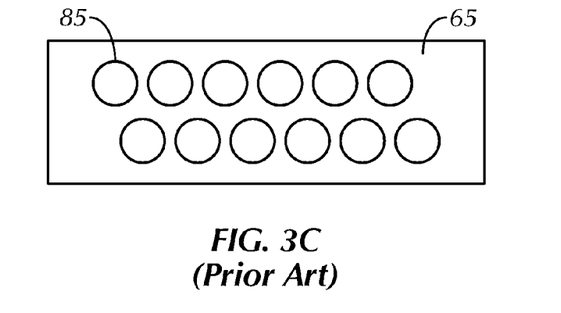
FIG. 3C illustrates a view of the pad positioned on the arm of the prior art borehole electric image logging tool.

A borehole electrical image logging tool is an important logging tool and, at the present time, has the highest resolution of any presently existing electrical logging tool that is sensitive to presence of mudcake. Examples of such tools are the FMI, STAR-II, EMI and CMI. These tools are produced by Schlumberger, Baker Hughes, Halliburton and Weatherford, respectively. A typical borehole electrical image logging tool B is illustrated in FIGS. 3A, 3B and 3C. As illustrated in FIG. 3A, tool B has six arms 45 equally disposed about a mandrel 55 with a 60 degree azimuth interval. As illustrated in FIGS. 3A and 3B, each arm 45 has a metal pad 65. The pad 65 illustrated in FIGS. 3B and 3C have 12 buttons 85 located on each pad 65 and arranged in two rows. As an example, in tool B, the vertical distance between the two rows is 0.76 cm and the horizontal shift is 0.25 cm. The diameter of the buttons 85 is 0.41 cm, and the outer diameter of the insulating ring of the buttons is 0.61 cm. The six pads 65 fix on the bottom of mandrel 55 and the current return electrode 95 is put on the top of the mandrel 55. It is also desirable to have an insulator disposed between current return electrode 95 and pad 14. As a non-limiting example, current return electrode can be located on mandrel 55.

During measurement, the pads 65 and buttons 85 are kept at a substantially equal potential and the current of each button 85 is measured. Next, the resistance from button 85 to return electrode 95 is calculated from the potential difference between the pad 65 and the return electrode 95 and the current of the button 85. The electrical image of the borehole will be obtained by converting these resistances to grey value and putting together according to their position.

It is known from the 2008 paper entitled "Full 3-D numerical modeling of borehole electric image logging and evaluation model of fracture" that a borehole image from an electrical imager is a popular deliverable in well logging.

As taught in Ke ShiZhen, the response of a borehole imager can be mathematically modeled as follows:

According to the principle and technical specification of a borehole electric image logging tool, the scalar potential in formation u(x,y,z) satisfies the following calculus variations:

$$F(u) = \quad (1)$$

$$\frac{1}{2}\int\!\!\int\!\!\int_\Omega \sigma\left[\left(\frac{\partial u}{\partial x}\right)^2 + \left(\frac{\partial u}{\partial y}\right)^2 + \left(\frac{\partial u}{\partial z}\right)^2\right]dxdydz - \sum_E I_E U_E \to \min,$$

where σ is the conductivity of media, $I_E$ is the current of button, $U_E$ is the potential of the button, F(u) is the function of potential.

By scattering, the element stiffness can be calculated using the following formula:

$$K_{ij}^e = \int\!\!\int\!\!\int_e \sigma\left[\frac{\partial N_i}{\partial x}\frac{\partial N_j}{\partial x} + \frac{\partial N_i}{\partial y}\frac{\partial N_j}{\partial y} + \frac{\partial N_i}{\partial z}\frac{\partial N_j}{\partial z}\right]dxdydz, \quad (2)$$

where $N_i$, $N_j$ are shape function.
The conductivity distribution of the model is as follows:

$$\sigma = \begin{cases} \sigma_m, & \text{in borehole} \\ \sigma_t, & \text{outside borehole} \end{cases}$$

where $\sigma_m$ is the conductivity of mud and $\sigma_t$ is the conductivity of the formation.

It is also taught by Ke ShiZhen that the potential of the pads and buttons are kept substantially equal and set to 10 volts in that particular work.

SUMMARY OF THE DISCLOSURE

An embodiment of the present disclosure is a method of detecting borehole standoff, comprising: injecting an electric current from an outer button and an inner button disposed on an equipotential pad into a subterranean formation surrounding the borehole, monitoring a voltage difference between the buttons and a return electrode, determining an apparent resistivity between the buttons and the return electrode, comparing a scaled button current for the outer button to a scaled button current for the inner button, and determining a ratio of the scaled button current for the outer button to the scaled button current for the inner button, wherein if the ratio is less than 1.04 indicates no standoff between the pad and the borehole and if the ratio is greater than or equal to 1.04 indicates standoff between the pad and the borehole.

Another embodiment of the present disclosure is a method of quantifying borehole properties, comprising: injecting an electric current from an outer button and an inner button disposed on an equipotential pad into a subterranean formation surround by the borehole, measuring an apparent conductivity or a scaled current for each button, modeling the measurements at a sequence of standoff locations, and, using an inversion technique to determine at least one of the following borehole properties: mudcake thickness, mudcake resistivity, diameter of invasion, flushed zone resistivity and true formation resistivity.

Still another embodiment of the present disclosure is a method of quantifying borehole properties, comprising: injecting an electric current from an outer button and an inner button disposed on an equipotential pad into a subterranean formation surround by the borehole, measuring an apparent conductivity or a scaled current for each button, modeling the measurements at a sequence of standoff locations, and, using a joint inversion technique to determine at least one of the following borehole properties: mudcake thickness, mudcake resistivity, diameter of invasion, flushed zone resistivity and true formation resistivity.

The foregoing summary is not intended to summarize each potential embodiment or every aspect of the present disclosure.

DETAILED DESCRIPTION OF THE DISCLOSURE

Figure 4:
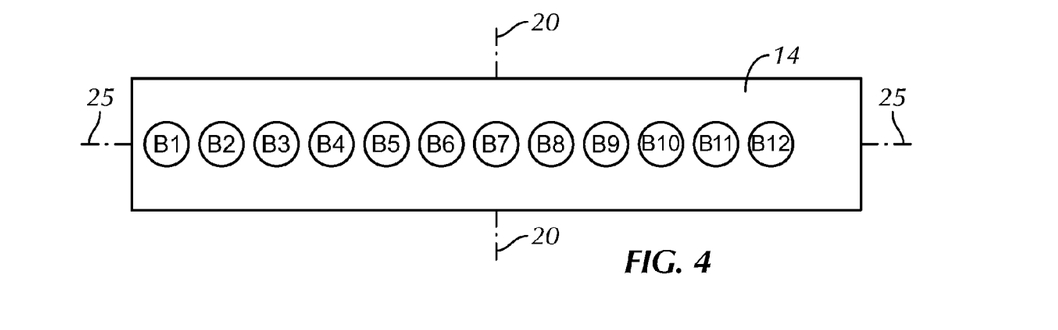
FIG. 4 illustrates a pad with electric imager buttons positioned thereon.

FIG. 4 illustrates a pad 14 according to the present disclosure. Pad 14 could be disposed on any of the electrical imaging tools discussed above. As discussed above, when operating an electrical image logging tool, current is emitted from button electrodes (i.e. buttons) B1, B2, B3, B4, B5, B6, B7, B8, B9, B10, B11 and B12. Pad 14 and buttons B1-B12 are held at the same potential (voltage). Thus, the pad 14 is an equipotential surface.

During use, the emitted current returns to a current-return electrode on the tool string. For example, as seen in FIG. 3A, the current-current return electrode 95 may be located on a mandrel 55 located above/uphole from the pads 14 located on the arms of tool B. As shown in FIG. 4, the buttons B1-B12 are arranged along a line 25. When disposed on the tool, the line 25 of buttons B1-B12 are preferably arranged to be perpendicular to the axis A of the tool in a manner similar to the configuration on the pad of the tool in FIG. 3B. It should be noted that dashed line reflects a line of symmetry 20 and also that buttons B1-B12 are preferably not perfectly symmetrically disposed about line of symmetry 20. Although the present embodiment includes twelve buttons B-B12, other configurations can be used as will be appreciated with the benefit of the present disclosure. For example, use of 24 buttons is known.

The buttons B-B12 are arranged along the line 25 and about the line of symmetry 20 so that there are at least two outer buttons one or more inner buttons. Where, outer refers buttons further away from the line of symmetry 20 than an inner button. For example, as seen in FIG. 4, buttons B1 and B12 are outer buttons, while button B6 is, in this example, an inner button. As discussed below, information from the outer and inner buttons can be analyzed to determine properties and characteristics downhole. For example, during analysis, the outer buttons can number at least four buttons and the inner buttons can number at least two or at least three.

The borehole image obtained with an electric imager tool is influenced by the presence of standoff in front of the imaging pads 14. When a borehole wall is smooth, the primary contributor to standoff is the presence of mudcake on the borehole wall.

It was previously unknown that, even under equipotential conditions, buttons B1-B12 had different depths of investigation. In other words, each button, for example B1-B12, depending on the presence of standoff, mudcake and the distance of the button from the borehole wall or mudcake and the thickness of any mudcake would measure a different distance into the formation. It has also been observed, but was previously not clearly understood that buttons, for example B5, B6 and B7, close to the center of the pad read deeper into the formation and are therefore less sensitive to standoff. It has also been observed, but was not previously clearly understood, that buttons, for example B1, B2, B11 and B12, on the edge of the pad 14 have a shallower depth of investigation. Until the present disclosure, it was also unrecognized that this phenomenon could be used as an aid in both the detection and quantification of mudcake in a borehole.

Figure 5:
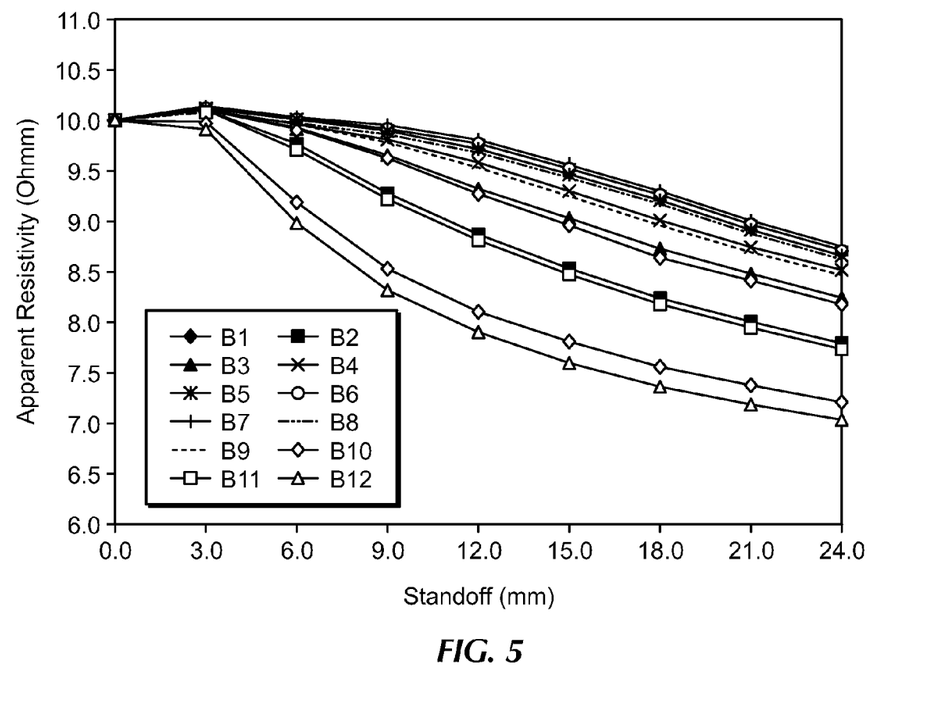
FIG. 5 is a graph of a series of 12 curves recording apparent resistivity (in ohms) on the y-axis versus the standoff of the different buttons on a pad of an electrical imager on the x-axis.

FIG. 5 illustrates a graph of the apparent resistivity versus standoff(distance from the borehole wall) for each of the twelve buttons B1-B12 located on pad 14 for a series of different standoff conditions. For example, standoffs of 3 mm, 6 mm, 9 mm, 12 mm, 15 mm, 18 mm, 21 mm and 24 mm are shown. As seen in FIG. 5, each button (B1-B12) generates a different curve. Each curve corresponds to an equation.

For analysis, these equations can be used in an inversion method. A well-known inversion method that can be applied here is a regularized nonlinear least squares algorithm; however, this is not meant to be limiting. In fact, more general object functions can be used here with or without the quadratic terms to determine the conductivity distribution profile near the pad surface. This distribution, as seen in FIG. 5, can disclose the presence of standoff and mudcake. For example, an inversion method may use a non-linear least squares algorithm to iteratively determine mudcake thickness, mudcake conductivity and flushed zone resistivity using all or some button measurements from imaging pad 14's buttons B1-B12.

It is also believed that deriving an average conductivity measurement using only edge buttons, such as buttons B1 and B12, will result in a shallow reading of apparent resistivity. Also, deriving an average conductivity measurement using buttons close to the center, such as buttons B6 and B7, will result in a relatively deep apparent resistivity measurement. It believed that taking the ratio between the two apparent conductivity measurements provides an indicator of the presence of mudcake.

In FIG. 5, for example, if there is no mudcake/standoff, the ratio would be very close to 1. Once there is mudcake, the curves start to separate, and then the ratio is greater than 1. Such behavior can be used as an indicator of mudcake. Phrased differently, these ratios can permit detection of mudcake. After mudcake is detected, it is often considered desirable to quantify the presence of mudcake. Typically, this quantification is the thickness of the mudcake layer.

Figure 6:
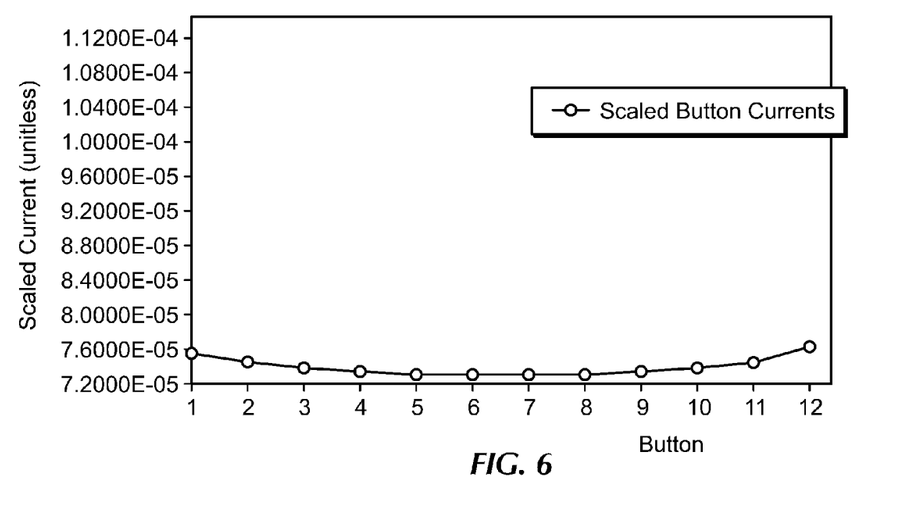
FIG. 6 is a graph of the Scaled Button Currents for a pad having 12 buttons and virtually no standoff.

FIG. 6 reflects the pad 14 and buttons B1-B12 with either zero or virtually no standoff between the pad 14 and buttons B1-B12 and the wellbore. The twelve buttons B1-B12 in question in this example, are positioned in the same generally linear fashion seen in FIG. 4, and the Scaled Button Currents of FIG. 6 reflect small variations in the amount of current at each of the buttons B1-B12. For example as seen in FIG. 6, button B1 carries a current of approximately 0.000076 amperes and button B2 carries a current of approximately 0.000074 amperes.

As also seen in FIGS. 4 and 6, having the ratio of the current carried in the outer buttons relative to the current carried in the central, also referred to as inner, buttons varies by less than two to three percent indicates either zero or virtually no standoff between the pad 14 and buttons B1-B12 in the wellbore.

As seen in FIG. 6, the ratio of current carried in outer buttons B1 and B12 and B2 and B11 can be compared to the currents carried by buttons B5 and B7 and button B6. In an either zero or virtually no standoff condition this ratio is less than 1.03. In particular, calculating the ratio of the current carried in outer buttons B1 and B12 to the current carried by button B6, in this example, provides a ratio of approximately 1.01. Similarly, the ratio of the current carried by buttons B2 and B11 to the current carried by buttons B5 and B7 is approximately 1.006, in this example. Because these ratios are less than approximately 1.04, this is indicative of either zero or virtually no standoff between the pad 14 and buttons B1-B12 from the wellbore in this particular example.

Figure 7:
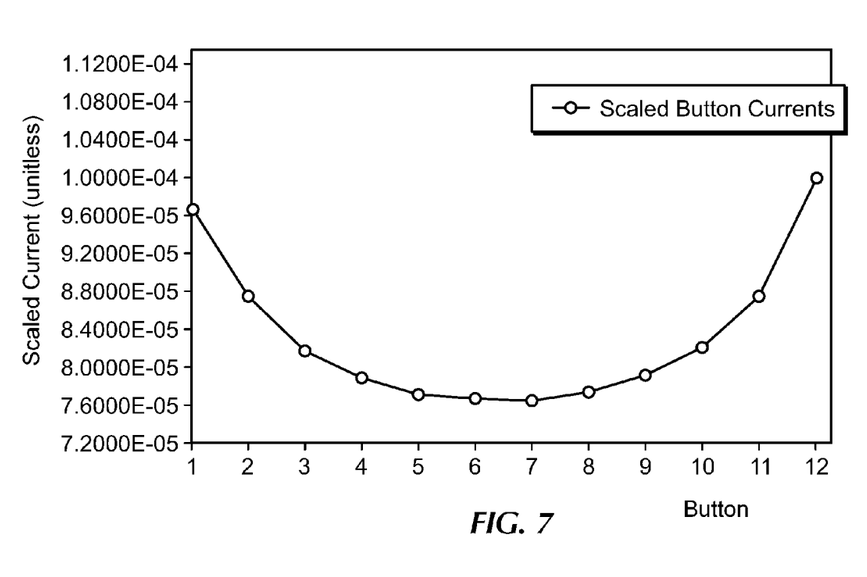
FIG. 7 is a graph of the Scaled Button Currents for a pad having 12 buttons and reflecting a "standoff" condition between the buttons and the borehole.

FIG. 7 reflects a situation where the pad 14 and buttons B1-B12 are standing off from the wellbore on the order of about 15 millimeters. Calculating the ratio of the Scaled Button Currents for the outer buttons B1 and B12, as described in FIG. 4, to the Scaled Button Currents for inner buttons B5, B6 and B7, as described above in FIG. 4, produces a ratio of approximately 1.15. This ratio is indicative of standoff between the pad 14 and the buttons B1-B12 from the wellbore. It should be noted that it is merely coincidental that a ratio of 1.15 indicated approximately 15 millimeters of standoff, as there would typically not be a direct correspondence. With this said, a larger ratio is generally indicative of greater standoff between the pad 14 and buttons B1-B12 from the wellbore. It should be further noted that the existence of standoff does not necessarily mean that mudcake is present in the borehole. For example, a noncircular or misshapen borehole may produce a "gap," referred to by those of skill in the art as "standoff" between the pad 14 and the borehole wall. However, if there is standoff between the pad 14 and the borehole wall, it is possible that the "gap" may result from the presence of mudcake. It should not be taken from this discussion that mudcake cannot appear in the noncircular borehole or that just because standoff is indicated that it always corresponds directly to mudcake thickness.

FIG. 5 is also a model of apparent resistivity at a series of standoff depths for the twelve buttons seen in FIG. 4. These curves could be generated using borehole electric imaging tools in a wellbore with known mudcake depth or could also be generated using a finite element method numerical modeling program. Thus, in use, buttons B1-B12, would generate a series of curves reflecting the apparent resistivity found in a wellbore in which it was desired to quantify the thickness of mudcake in the wellbore. These measured curves can then be compared to already known apparent resistivity versus standoff curves using a variety of well-known modeling methods, as discussed above. As also discussed above, a regularized nonlinear least squares algorithm may be used. However, this is not meant to be limiting. In fact, more general object functions can be used with or without quadratic terms.

It is also believed that the teachings of the present disclosure could be used in conjunction with a deep reading resistivity tool when the depth of mudcake or invaded zone exceeds about 20 inches (50.8 cm). In this situation, a laterolog or an induction tool can provide an electric log containing deeper information into the formation surrounding the borehole. It may also be useful to use more than one deep reading resistivity tool. In other words, a laterolog and an induction tool can be used together in the same tool string. These tools can be operated together or separately.

Figure 8A:
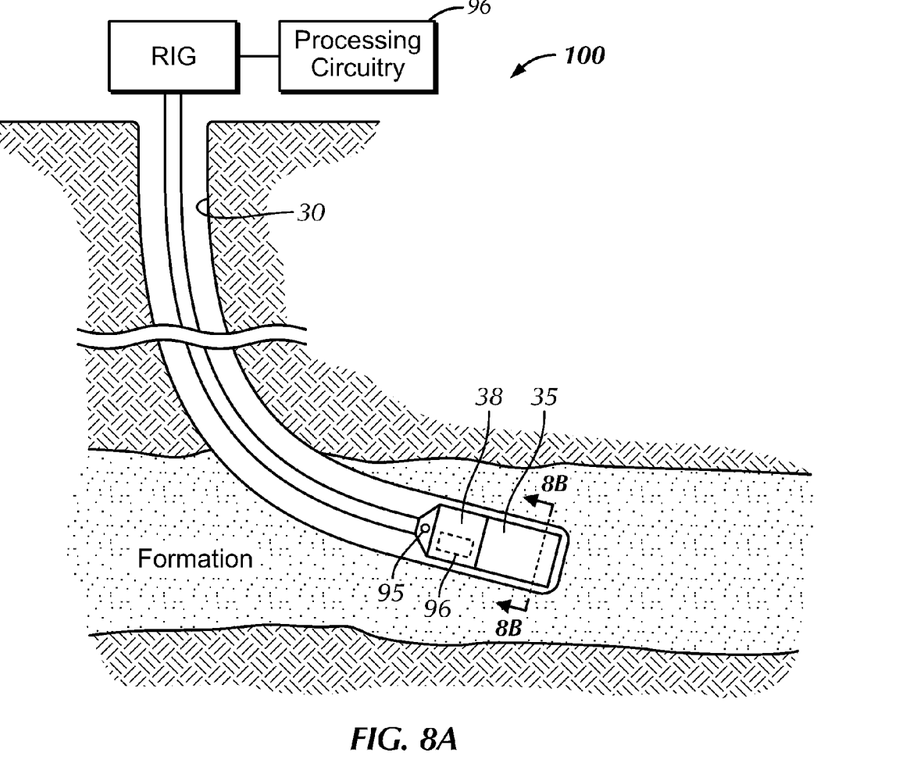
FIG. 8A illustrates a tool string in a borehole employing an apparatus of the present disclosure.

FIG. 8A illustrates a drill string 100 disposed in a borehole 30. Drill string 100 has at least an electric logging tool 35 disposed thereon. The electric logging tool can be any of the tools discussed above. Namely, the microlog tool E, focused or microlaterolog device L or the borehole electrical image tool B. Processing circuitry 96 used in conjunction with the logging tool 35 and a deep reading resistivity tool can be disposed downhole on the drill string 100 with the logging tool and can be configured to monitor a voltage difference between the buttons B1-B12 and a return electrode 95 to determine information according to the purposes disclosed. If communication from tool 35 to the surface is available via telemetry or the like, some or all of the processing circuitry may be disposed uphole at the surface. As also discussed above, the deep reading resistivity tool 38 could also be used be used with a tool 35.

Figure 8B:
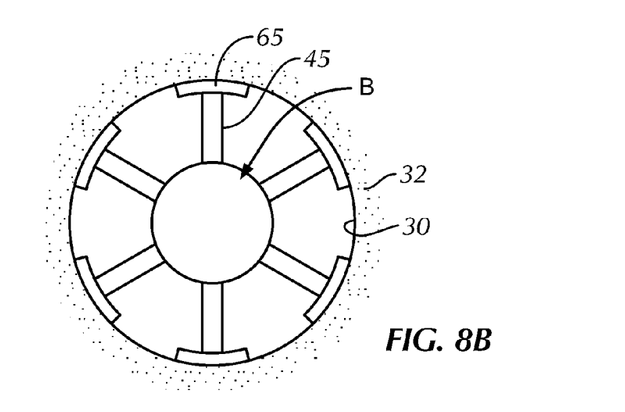
FIG. 8B illustrates a cross-sectional view of the tool string of FIG. 8A.

FIG. 8B illustrates a cross-sectional view of the tool B positioned in borehole 30 and shows the position of mudcake 32 in borehole 30.

The foregoing description of preferred and other embodiments is not intended to limit or restrict the scope or applicability of inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of detecting standoff in a borehole, comprising:
    injecting an electric current from buttons disposed along a line on an equipotential pad into a subterranean formation surrounding the borehole, each of the buttons being similar to a same size as one another, and the buttons including at least two outer buttons and one or more inner buttons, the one or more inner buttons disposed along the line in between the at least two outer buttons;
    monitoring a voltage difference between the buttons and a return electrode;
    determining an apparent resistivity between the buttons and the return electrode;
    determining a first current for the at least two outer buttons and a second current for the one or more inner buttons;
    determining a ratio of the first current to the second current; and
    determining a standoff condition between the pad and the borehole based on the determined ratio.

2. The method of claim 1, wherein if the ratio is less than 1.04, the determined standoff condition indicates no standoff.

3. The method of claim 1, wherein if the ratio is greater than 1.04, the determined standoff condition indicates a standoff between the equipotential pad and the borehole.

4. The method of claim 1, wherein the at least two outer buttons number at least four.

5. The method of claim 4, wherein the one or more inner buttons number at least two.

6. The method of claim 1, wherein the equipotential pad is insulated from the return electrode by an insulator.

7. The method of claim 1, further comprising determining a standoff value for the standoff condition based on the apparent resistivity for one or more of the buttons.

8. The method of claim 7, further comprising correlating the determined standoff value to a thickness of mudcake.

9. The method of claim 1, wherein the buttons are disposed on the pad along the line for orientating perpendicularly to an axis of investigation.

10. The method of claim 9, wherein the buttons are disposed along the line asymmetrically on sides of a symmetrical divide of the pad.

11. A downhole logging tool for a borehole, comprising:
    a return electrode associated with the tool;
    a pad associated with the tool;
    a plurality of buttons disposed along a line on the pad and held at a same potential as the pad, each of the buttons being similar to a same size as one another, and the buttons including at least two outer buttons and one or more inner buttons, the one or more inner buttons disposed along the line in between the at least two outer buttons, the buttons injecting an electric current into a subterranean formation surrounding the borehole; and
    processing circuitry associated with the tool and monitoring a voltage difference between the buttons and the return electrode, the processing circuitry configured to:
    determine an apparent resistivity between the buttons and the return electrode,
    determine a first current for the at least two outer buttons and a second current for the one or more inner buttons,
    determine a ratio of the first current relative to the second current, and
    determine a standoff condition between the pad and the borehole based on the determined ratio.

12. The tool of claim 11, wherein if the ratio is less than 1.04, the determined standoff condition indicates no standoff.

13. The tool of claim 11, wherein if the ratio is greater than 1.04, the determined standoff condition indicates a standoff between the equipotential pad and the borehole.

14. The tool of claim 11, wherein the at least two outer buttons number at least four.

15. The tool of claim 14, wherein the one or more inner buttons number at least two.

16. The tool of claim 11, wherein the equipotential pad is insulated from the return electrode by an insulator.

17. The tool of claim 11, wherein the processing circuitry is configured to determine a standoff value for the standoff condition based on the apparent resistivity for one or more of the buttons.

18. The tool of claim 17, wherein the processing circuitry is configured to correlate the determined standoff value to a thickness of mudcake.

19. The tool of claim 11, wherein the buttons are disposed on the pad along the line for orientating perpendicularly to an axis of investigation.

20. The tool of claim 19, wherein the buttons are disposed along the line asymmetrically on sides of a symmetrical divide of the pad.

21. A method of detecting standoff in a borehole, comprising:

injecting, relative to a return electrode, electric current from buttons disposed along a line on an equipotential pad into a subterranean formation surrounding the borehole, each of the buttons being similar to a same size as one another, and the buttons including at least two outer buttons and one or more inner buttons, the one or more inner buttons disposed along the line in between the at least two outer buttons;

determining a first current value for the at least two outer buttons and a second current value for the one or more inner buttons;

determining a ratio of the first current value to the second current value; and determining a standoff condition between the pad and the borehole based on the determined ratio.

22. The method of claim 21, further comprising determining a standoff value for the standoff condition based on apparent resistivity for one or more of the buttons.

23. The method of claim 22, further comprising correlating the determined standoff value to a thickness of mudcake.

24. A downhole logging tool for a borehole, comprising:

a return electrode associated with the tool;

a pad associated with the tool;

a plurality of buttons disposed along a line on the pad and held at a same potential as the pad, each of the buttons being similar to a same size as one another, and the buttons including at least two outer buttons and one or more inner buttons, the one or more inner buttons disposed along the line in between the at least two outer buttons, the buttons injecting an electric current into a subterranean formation surrounding the borehole; and processing circuitry associated with the tool and configured to:

determine a first current value for the at least two outer buttons and a second current value for the one or more inner buttons, determine a ratio of the first current value relative to the second current value, and determine a standoff condition between the pad and the borehole based on the determined ratio.

25. The tool of claim 24, wherein the processing circuitry is configured to determine a standoff value for the standoff condition based on apparent resistivity for one or more of the buttons.

26. The tool of claim 25, wherein the processing circuitry is configured to correlate the determined standoff value to a thickness of mudcake.

* * * * *